United States Patent [19]

Ng

[11] Patent Number: 5,049,897

[45] Date of Patent: Sep. 17, 1991

[54] METHOD AND APPARATUS FOR BEAM DISPLACEMENT IN A LIGHT BEAM SCANNER

[75] Inventor: Yee S. Ng, Fairport, N.Y.

[73] Assignee: Eastman Kodak Company, Rochester, N.Y.

[21] Appl. No.: 491,029

[22] Filed: Mar. 9, 1990

[51] Int. Cl.[5] .......................... G01D 9/42; H04N 1/21
[52] U.S. Cl. ........................................ 346/1.1; 346/108
[58] Field of Search .................. 346/1.1, 76 L, 107 R, 346/108, 160; 358/296, 300, 302; 350/6.5, 6.7, 6.8, 6.9

[56] References Cited

U.S. PATENT DOCUMENTS

| | | | |
|---|---|---|---|
| 4,321,700 | 3/1982 | Russell | 369/44 |
| 4,441,126 | 4/1984 | Greening et al. | 358/300 |
| 4,805,012 | 2/1989 | Agnostinelli et al. | 358/75 |

OTHER PUBLICATIONS

Laser Scanning for Electronic Printing Urbach et al, Proc. of the IEEE, vol. 70, No. 6, Jun. 1982, pp., 597-618.
Product Brochure for Sight-Mod ™ Programmable Data Display System (undated).
Semetex News Release, Mar. 28, 1986.
Useful Optical Data on Sight-Mod ™ Chip (undated).

Primary Examiner—Mark J. Reinhart
Attorney, Agent, or Firm—Warren W. Kurz

[57] ABSTRACT

A method and apparatus is provided for line scanning a beam receiving member, wherein a scanning beam is angularly or laterally displaced to compensate for potential scan line spacing error. The beam is displaced according to error arising from variation (flutter) in the relative motion of the beam and the beam receiving member, or according to error arising from movement of the receiving member while the scanning beam travels to a start of scan position, or both. Embodiments of beam displacement means include a row-addressable light valve array and an area-addressable light valve array.

22 Claims, 3 Drawing Sheets

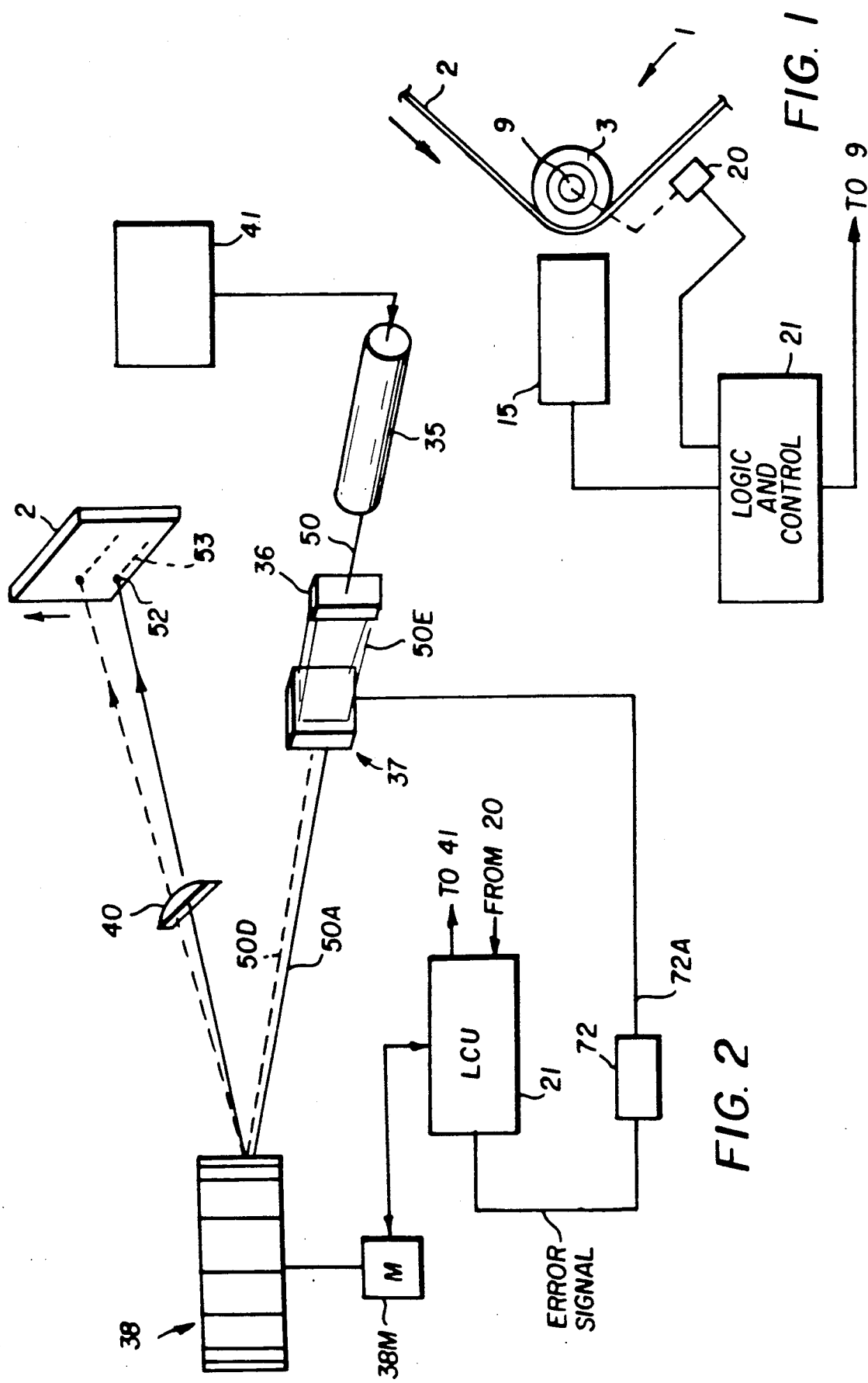

METHOD AND APPARATUS FOR BEAM DISPLACEMENT IN A LIGHT BEAM SCANNER

BACKGROUND OF THE INVENTION

1. Field of the Invention

This invention relates to light beam scanning methods and apparatus, and more specifically, to methods and apparatus for minimizing or eliminating the effects of scan line spacing error.

2. Description of the Prior Art

Some reproduction apparatus, such as certain versions of electrostatographic printers or copiers, use a beam scanning process for exposure of a photosensitive member. Often called output scanning, the process provides for imagewise modulation of a light beam as the beam is moved relative to the surface of the photosensitive member. A latent image, composed of scan line exposures, is then developed and transferred to a receiver to provide a reproduction of the original image.

Image degradation occurs when the spacing of scan line exposures is non-uniform. Scan line spacing error creates a density banding effect, which is a visible and highly-objectionable variation in image density between recorded raster lines in the final print. The density banding may be sufficient to cause image degradation that is immediately visible in a monochromatic print.

If color separation images are to be superposed on a single receiver to form a multicolor image, very precise registration of the images governs the quality of the multicolor image. Similarly, successive images may be individually used as color separation masters in a xeroprinting, lithoprinting, or other print-making apparatus, wherein the accuracy of image registration is often critical to final print quality. Scan line spacing errors in the various print layers of a composite multicolor print can produce undesirable color shifts and loss of detail.

Some scan line spacing error is attributable to a variation, or "flutter", in the transport speed of the photosensitive member. This variation is typically due to transport rate errors in the transport system for the photosensitive member. Nearly all types of electrophotographic copiers and printers experience some flutter due to friction or mechanical inaccuracy in the transport system. Another source of flutter is the drag imparted to the photosensitive member as it is acted upon by the toning, transfer, and cleaning stations. The reduction of flutter is therefore a laborious and costly proposition, and typically reduces the simplicity and reliability of the apparatus.

Scan line spacing error in an output scanner also occurs due to imprecise timing of line exposures relative to the movement of the photosensitive member. Beam scanning must be coordinated with the speed and position of the photosensitive member and with the modulation, or illumination control, of the beam. Successive scans provided by a beam deflector construct an entire image on the web, but the web rotates asynchronously with respect to the location of the light beam on the scan line. Hence, when the web is in a position to receive the line scan exposure, the beam deflector may not be in the proper position for starting a scan line. The exposure must be delayed to allow the beam deflector to move to the requisite position for initiating a scan line. In the worst case, the beam deflector will have just passed the requisite position when the exposure is due. Significant misregistration of the exposure then occurs.

A scanning exposure station writes the image one pixel at a time in numerous line scans; an image is completed in roughly a second. In contrast, optical input copiers generally flash expose the entire image frame in roughly one-tenth of a millisecond. A higher amount of flutter is tolerated (and therefore present) in an optical input copier.

Certain attributes of output scanners, such as their high resolution, make them attractive as a replacement for the exposure station of an optical input copier or printer. However, the conversion is difficult because the flutter present in an optical input copier will negate much, if not all, of the image quality improvement afforded by the changeover to an output scanner. In other words, an amount of flutter that is acceptable in a flash exposure will cause undesirable image banding artifacts during a one-second scanning exposure. Accordingly, significant changes to the photosensitive member transport are typically expected if such a conversion is to succeed.

In U.S. Pat. No. 4,779,944, issued in the name of Ritter et al., an acousto-optical diffraction grating modulator is used to compensate for minor errors associated with a photosensitive member transport system. The modulator deflects a laser beam to compensate for positional errors associated with a xerographic drum rotation mechanism.

However, acousto-optical modulators can be relatively complex and expensive. An acousto-optical modulator typically requires a radio frequency generator which applies an amplified, high frequency signal to an acoustic transducer. The transducer then launches acoustic waves in the acousto-optical cell to create a diffraction wave grating. The radio frequency generator is subject to instability and requires frequent realignment of the amplitude and frequency of its output. Moreover, the rise time of an acousto-optical modulator is dependent upon the diameter of the modulated light beam. Hence, to achieve high speed from an acousto-optical modulator, it is necessary to reduce the dimension of the optical beam that is crossed by the acoustic wave. This reduction is undesirable, as additional beam-shaping optical components are then required to restore the beam to a proper condition.

SUMMARY OF THE INVENTION

Therefore, it an object of this invention to provide a beam scanner for providing line scanning wherein image banding and other effects of scan line spacing error are minimized, without resorting to the complexity and expense of prior art methods and apparatus.

It is also an object to provide a beam scanner that may replace the use of a conventional exposure station in an optical copier or printer without resort to extensive improvements to the existing photosensitive member transport.

These and other objects are accomplished in a method for beam scanning of a scan receiving member. A portion of a generated light beam is admitted and the remainder of the light beam is blocked so as to form an admitted light beam. The admitted light beam is deflected so as to effect repeated line scanning of the scan receiving member with spacing provided between sequential scan lines. The scan line spacing error is determined and the admitted light beam portion is controlled in accordance with the determination of the scan line spacing error so as to displace the admitted light beam to compensate for such error.

In another aspect of the invention, a beam scanning apparatus includes means for admitting and blocking respective portions of the light beam so as to form an admitted beam. There is provided means for deflecting the admitted light beam so as to effect plural line scanning of the scan receiving member, means for providing spacing between sequential scan lines, and means for determining scan line spacing error. Means for controlling the first light beam portion in accordance with the determination of the scan line spacing error is provided to displace the admitted light beam to compensate for such error.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which:

FIG. 1 is a schematic side view of a light beam scanning station constructed according to the present invention.

FIG. 2 is a simplified schematic view of an output scanner, for use in the beam scanning station of FIG. 1, which includes a scan line spacing error compensation means operable according to the present invention.

DETAILED DESCRIPTION OF THE INVENTION

Figure 3:
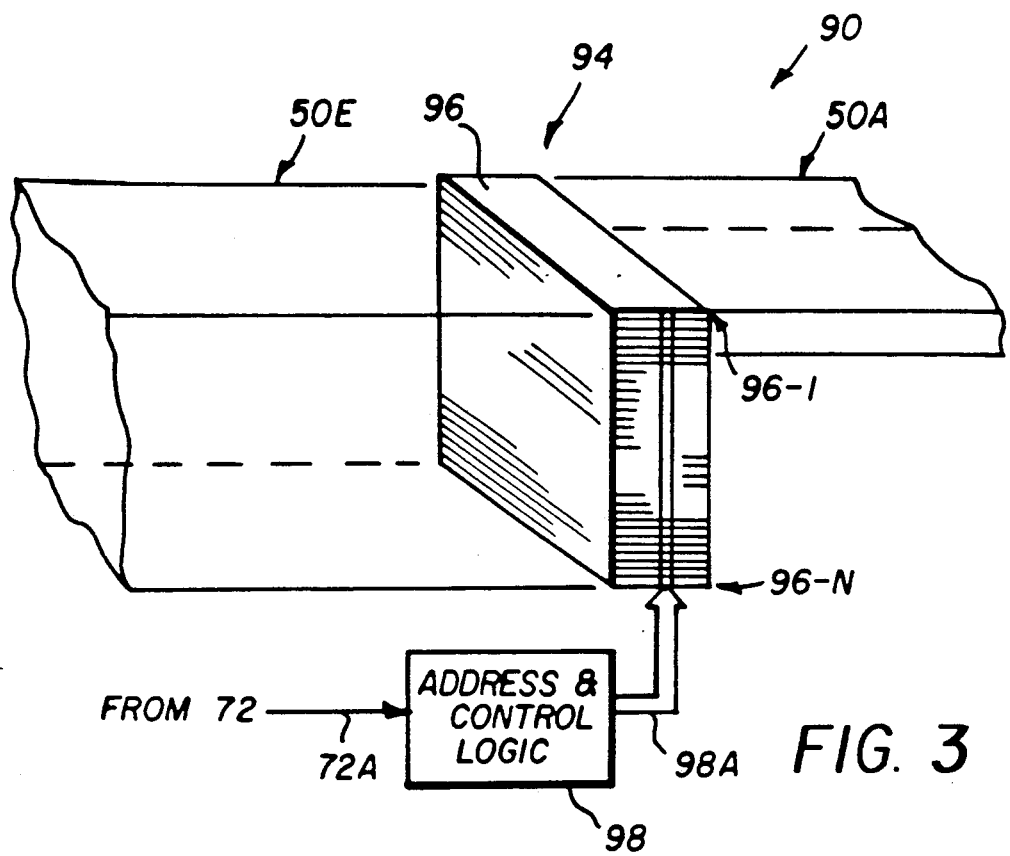
FIG. 3 is a side schematic view of a row-addressable light valve array for use in the scan line error compensation means of FIG. 2.

According to FIG. 1, there is shown a light beam scanning apparatus 1 constructed according to the present invention. The apparatus 1 is preferably useable as a scanning exposure station in an electrophotographic reproduction apparatus. The invention is particularly useful in the production of a high-resolution monochromatic reproduction. The image content of such a reproduction includes, for example, detailed maps, charts, and the like.

Several of such reproductions may also be used as color separation masters in xeroprinting, lithoprinting, or other such apparatus to make multicolor reproductions. The invention may also be utilized in the production of a composite multicolor reproduction wherein several latent images are developed with colored toners and superposed on one receiver. The development process thus uses toners of differing color, for example, cyan, magenta, yellow, and black.

However, the invention can be used in many known systems in which an image, latent or otherwise, is recorded by scan exposure of a photosensitive member. Such systems may include the printing, reproduction, or facsimile of images according to techniques in the graphic and photographic arts, data recording art, and radiographic art. Additionally, the beam scanning apparatus 1 can find use in displacement of a scanning beam in what are known as input scanners, wherein beam scanning is used for image reading and image transmission.

Accordingly, a beam receiving member in the form of a photosensitive endless web 2 is trained about an image formation roller 3. A web transport means 9 causes the web 2 to travel past a light beam source 15. Web transport rate and web position is sensed by an encoder 20 on the drive means. The encoder 20 supplies the sensed information to a logic and control unit (LCU) 21. The output of the encoder 20 allows the LCU 21 to continuously calculate web transport rate and position for effecting control of the output scanner 15 and the drive means 9. Such information can be provided by other known sensors that may be triggered by certain indicia. For example, conductive, magnetic or optically sensible indicia on the web 2 can be sensed by appropriate sensors.

The preferred embodiment of the web 2 includes one or more photoconductive layers, a conductive layer, and a support. The web 2 may be charged, then exposed at the beam scanning apparatus 1 to create a latent electrostatic image thereon, and later developed and transferred to a receiver. Process stations appropriate for carrying out these tasks are well-known in the art and have been omitted from FIG. 1 for clarity.

FIG. 2 is a more detailed view illustrating a preferred embodiment of the beam scanning apparatus of FIG. 1. The light beam source 15 includes a laser 35, a beam expander 36, beam displacement means 37, a beam deflector 38, a beam deflector drive motor 38M, and an F-$\Theta$ lens 40. The beam source 15 is preferably capable of fairly high image resolution, such as resolution of up to 800 dots per inch. The laser 35 is preferably a He-Ne laser or laser diode which is modulated by image data received from a computer, memory, or other image data producer 41. The image data represents one or more of the desired monochromatic images to be reproduced. The light beam 50 emitted from the laser 35 is expanded by beam expander 36 to provide an expanded beam 50E incident on the face of the beam displacement means 37. The incident beam is selectively admitted to form an admitted beam 50A which may be displaced according to the present invention. (For purposes of illustration, a displaced beam 50D is shown in phantom, to distinguish the undisplaced beam 50A).

The beam deflector 38 shown in FIG. 2 is illustrative of the invention and is simplified in the interest of clarity, and thus will not be described in detail herein. The illustrated beam deflector 38 may be provided by a rotating polygon, rotating holographic disc (hologon), or galvanometer mirror as is known in the art. Typically, the beam deflector is driven by motor 38M, as illustrated, so as to impart a linear scanning motion to the light beam 50A or 50D admitted by the beam displacement means 37. The beam deflector 38 has one or more beam-deflecting facets, wherein an operative facet deflects the modulated light beam 50 or 50D to cause the beam to trace a beam point 52 in a line scan 53. Preferably, the beam deflector 38 is driven at a constant angular velocity by the motor 38M.

The position of the scanning beam is sensed by a start of scan sensor (not shown), the output of which is monitored by clock circuitry in the LCU 21. As is known, the LCU 21 may calculate the beam position in the line scan from the timing of the start of scan signal. The LCU 21 controls scan line exposure by signalling the release of image data from the image data producer 41 to the laser 35 for modulation of the beam 50. The logic and control unit 21 thus initiates each in a plurality of scan exposures to create an image frame (an electrostatic image on the charged web 2).

For each scan exposure to take place, the beam 50 from the laser 35 is selectively modulated according to image data received by the laser 35 to provide imagewise exposure of the web 2. Hence, the laser 35 is modulated such that only during a portion of a selected line scan is the beam intensity sufficient to expose the photosensitive member. At other times the beam continues to be deflected (scanned) but the modulation is such that no exposure is effected. The modulation of the laser 35 is provided by associated electro-optical components and electrical circuitry within the laser 35. Although the modulation may be bilevel, or controlled about a lasing threshold, other forms of modulation may be used. For example, it is also within the contemplation of the invention that the laser beam be pulse-width or amplitude modulated.

The scan exposures are spaced due to relative movement between the web 2 and the beam 50. Thus, in the preferred embodiment, the rate of relative movement is the transport rate. Preferably, this movement is provided while the web 2 is continuously transported in the cross-scan direction. Alternatively, it is contemplated that the illustrated embodiment may be modified as is known in the art such that the web 2 is stationary and the scanning beam includes a cross-scan movement. Such a cross-scan movement would preferably be made during the interval between successive line exposures.

Pulses from the encoder 20 (FIG. 1) trigger a clock in the LCU 31 to provide for calculation of the web transport rate. Low frequency variations in the transport rate are corrected by phase-locking the speed of the motor 38M to the speed of the web transport means 9. High-frequency variations of the web transport rate speed are compensated according to the beam displacement means 37 according to the present invention, as will be described shortly.

In the preferred embodiment, the web transport rate is monitored to discern potential errors which would cause the scan line spacing to vary from a predetermined constant or set of constants. The LCU 21 includes known logic circuitry which compares the web transport rate to a predetermined calibrated constant to determine transport rate error (flutter). For example, the LCU 21 may include pulse counting logic, wherein one counter is connected to a crystal clock and another counter is connected to the encoder 20 on the web drive. The disparity of the counter outputs then indicates the extent that the web transport rate has deviated from the predetermined constant.

Because the scanning of the laser beam is not synchronized with the movement of the web 2, it is highly possible that the operative facet of the beam deflector 38 may be at a position other than that required for initiation of a scan exposure. Therefore, the web 2 then continues to travel while the beam deflector 38 rotates. Although another facet is quickly provided at the requisite position, the elapsed web travel contributes to scan line spacing error. The potential scan line spacing error due to the elapsed web travel is calculated by the LCU 21.

Potential scan line spacing error, calculated from either a variation in the transport rate, or an instance of elapsed web travel, or both, is compensated by one of two preferred embodiments of the beam displacement means 37. Such means 37 is positioned in the path of the beam 50 so as to laterally or angularly displace the beam 50 in the cross-scan direction. Beam displacement is controlled by a control signal from the LCU 21 to a driver 72. Suitable circuitry in the driver 72 translates the control signal into a drive signal on line 72A for driving the beam displacement means 37.

The control signal is in the form of, for example, a digitized code or an analog signal that indicates the requisite direction and amount of beam displacement to correct the scan line spacing error. For example, if the transport rate increases, the control signal may indicate that the laser beam 50 is to be displaced in the direction of web travel to compensate. If the transport rate decreases, the control signal would indicate a displacement in the opposite direction. An example of a displaced beam 50D with respect to the undisplaced beam 50 is illustrated in FIG. 2.

Figure 4:
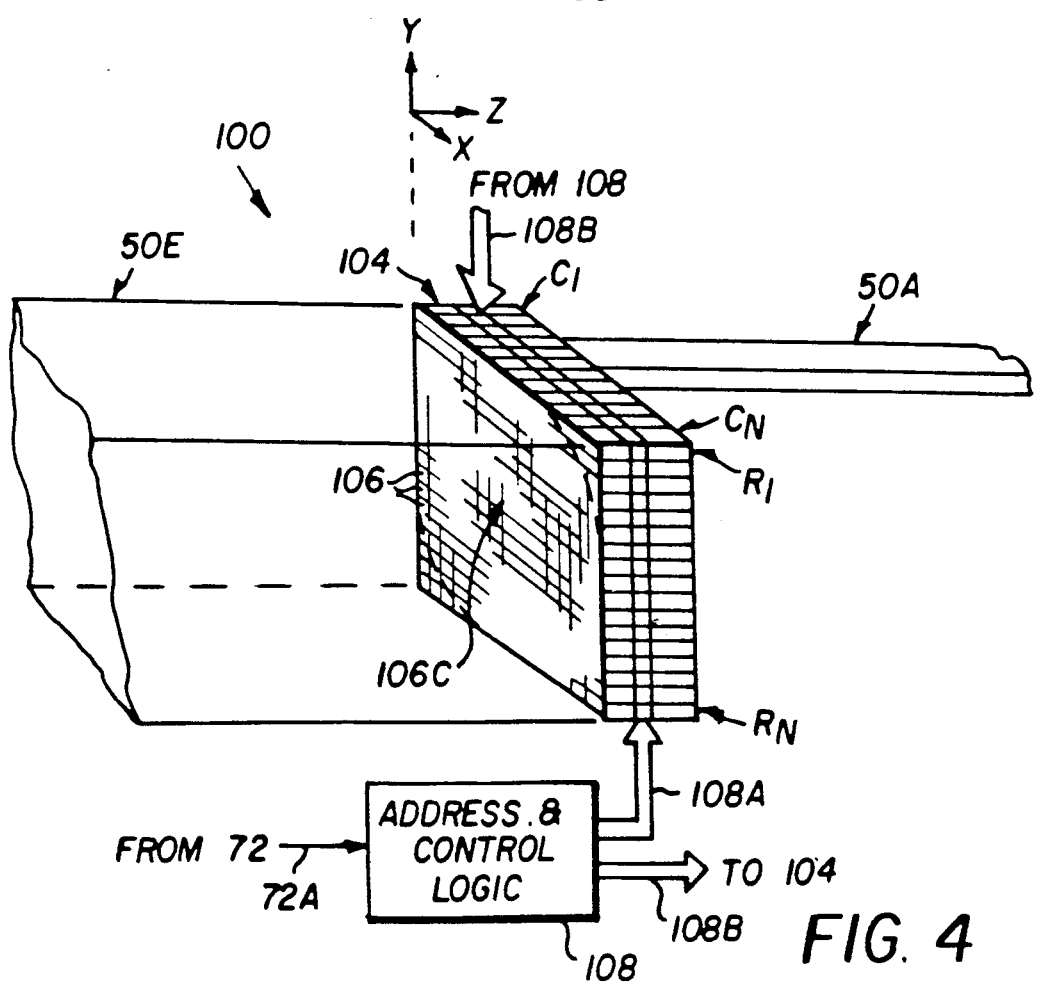
FIG. 4 is a side schematic view of an area-addressable light valve array for use in the scan line error compensation means of FIG. 2.

With reference now to FIGS. 3 and 4, two preferred embodiments of the beam displacement means 37 of FIG. 2 will be described.

FIG. 3 illustrates a row-addressable light valve array 94 which comprises N stacked light valve elements 96-1 to 96-N. Each element is nominally opaque until enabled to become optically-transmissive. An element is enabled by a row enable signal 98A provided by a converter 98 upon receipt of the drive signal on line 72A. The converter 98 generally enables a selectable group of contiguous elements 96 to admit a portion of the expanded beam 50E through the "window" of contiguous elements. The admitted beam 50A is centered on the window. The remainder of the expanded beam is blocked by the non-enabled elements.

The light valve array 94 is preferably a panel of ferroelectric ceramic material, such as lanthanum doped lead zirconate titanate (PLZT), sandwiched between orthogonally-aligned ingress and egress polarizer layers. The panel is activated to operate in a quadratic Kerr cell mode. The panel has a plurality of discrete exposure elements. Spaced electrode structures allow an electrical field to be applied in a direction transverse to the direction of light passing through the panel. The applied field changes the polarization of passing light by 90°.

Thus, an enable signal to a particular address electrode provides an applied field to a respective row. Light entering the ingress polarizer is polarized, rotated in polarization by 90° by the enabled panel, and exits the egress polarizer. The polarity of light entering a non-energized (disabled) element is not rotated and is blocked by the egress polarizer.

The admitted beam 50A may therefore be selectably displaced relative to the center of the incident beam 50E by enabling a certain window of elements 96. For example, the array 94 may comprise 32 elements (elements 96-1 through 96-32). When the LCU error signal is zero, the converter 98 may enable eighteen light valve elements 96-8 to 96-26. The remainder of the elements (96-1 to 96-7, and 96-27 to 96-32) are not enabled and are opaque. The window is thus an eighteen-element-high array portion centered at element 96-17. If the error signal indicates that the line spacing is about to change, there is an adjustment to the level of the window in proportion to the web transport rate change. Elements 96-2 to 96-22 may be enabled and elements 96-1 and 96-23 to 96-32 not enabled to elevate, for example, the admitted beam 50A. As a result, the admitted beam 50A then is incident on the web 12 at a higher position. The window may of course be adjusted also to displace the beam downward.

A second preferred embodiment of the beam displacement means 37 is illustrated in FIG. 4. An area-addressable light valve array 104 includes elements 106 which operate in a fashion similar to the elements of the row-addressable valve array 94 illustrated in FIG. 5. A commercial embodiment of such an array is available and is known as the Semetex Sight-Mod ™ display device, manufactured by the Semetex Corporation of Torrance, CA. These display devices are available in a 48×48 or 128×128 element matrix configuration, although other configurations from other sources may be used.

The light valve elements 106 are arranged in a row ($R_1$ to $R_N$) by column ($C_1$ to $C_N$) matrix. The elements 106 are individually enabled by signals on a row enable line 108A and a column enable line 108B to assume either an optically-transmissive or an optically-opaque state. The enabling signals are provided by the converter 108 upon receipt of the drive signal on line 72A from the driver 72.

A portion of the expanded beam 50E is selectably admitted through a window of enabled elements 106 which is nominally centered on the central element 106C. By shifting the window away from the central element 106C, the admitted beam 50A is thereby displaced (to become displaced beam 50D). The enabling signals are, as described above, generated according to the error signal from the LCU 21. Moreover, the number of elements in a window is adjustable according to a window area modulation technique as will now be described with respect to FIGS. 5 and 6.

Figure 5:
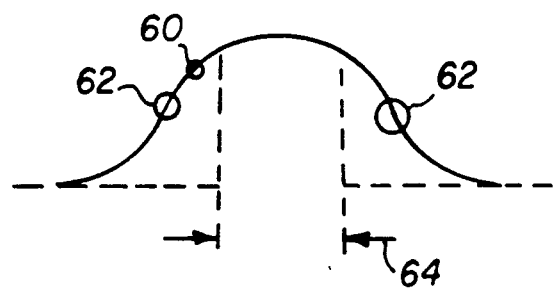
FIG. 5 is a graphical representation of the intensity of the expanded light beam provided to the scan line spacing error compensation means of FIG. 2.

The laser 35 is preferably a helium-neon laser, although a laser diode emitting in the infared region may also be used. One preferred example of the latter is commercially available as the NEC NDL3200 680 nm laser diode. Such lasers are likely to have a Gaussian power distribution across the width of the outputted light beam 50. With reference to FIG. 5, the typical power distribution of the laser beam 50 may be seen. The portions of the power distribution curve 60 in the region of the half power points 62, and outward, indicate an undersirable non-uniformity of power distribution. Unless such non-uniformity is remedied, the intensity of the admitted beam 50A will vary as the window is moved from central element 106C.

Therefore, the aperture of the beam expander 36 includes a mask (not shown) of dimensions such that the low-power fringes of the expanded beam 50E are masked. If necessary, the intensity of the light emission from the laser 35 is increased to compensate for the masking loss. The expanded beam 50E then has a more uniform power distribution over the selected beam width 64.

The residual non-uniformity of the masked beam width 64 is then compensated by window area modulation. That is, as the window of enabled elements in the array 94 or 104 moves from the center of the array, the number of elements in the window is increased in proportion to the decrease in the beam power distribution.

Figure 6:
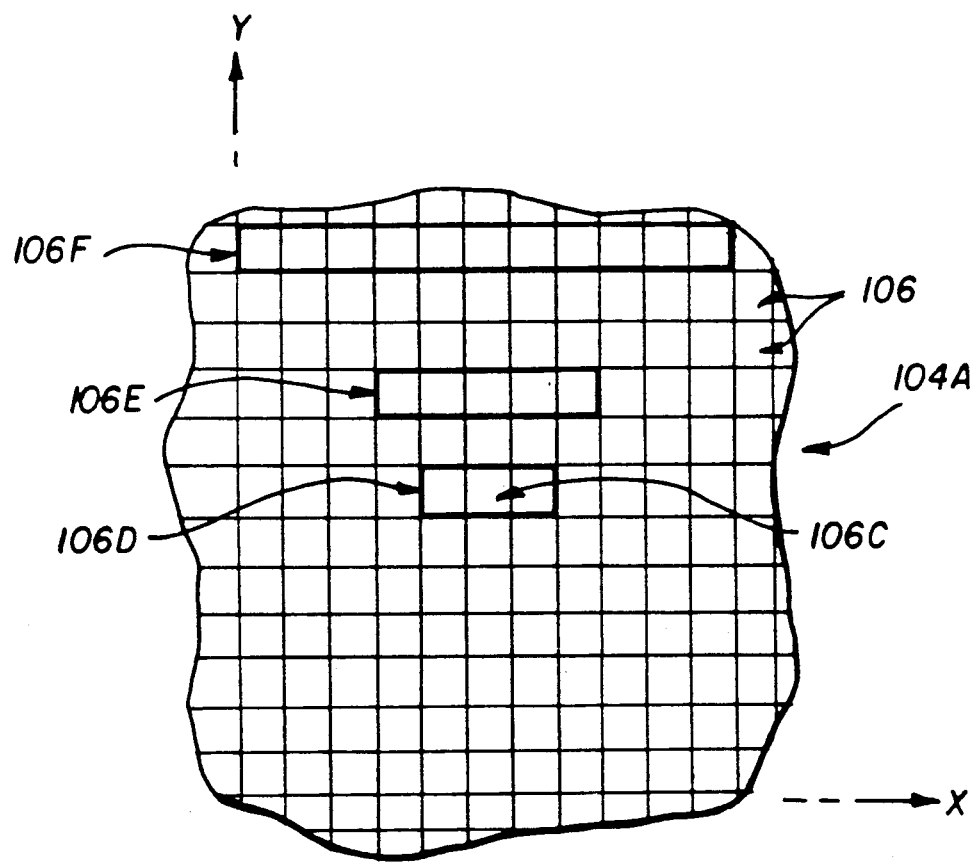
FIG. 6 is a side schematic view of a portion of the face of the area-addressable array of FIG. 4.

A representation of window area modulation for the area-addressable array 104 is illustrated in FIG. 6. An enlarged central portion 104A of the area-addressable array 104 is shown. A central window 106D of only few elements may provide an undisplaced beam centered on the central element 106C. As the window is moved, the LCU 21 increases the elements in the window (illustrated, for example, in FIG. 6 as groups 106E or 106F). Overall, the number of enabled elements increases and the number of non-enabled elements decreases as the window moves away from the center element 106C. Therefore, the average power of the admitted beam 50A is held constant, even during displacement.

An attribute of the light valve arrays 94 and 104 of FIGS. 3 and 4 is that the fineness of beam displacement is therefore limited only by the average size of the valve element used. Hence, the resolution of displacement can be quite small if an appropriate array is chosen. Corrections to line scan error are therefore quite accurate.

Light valve arrays 94 and 104 are simple to operate and do not require extensive ancillary apparatus. The light valve arrays have no moving parts and therefore are not subject to mechanical inertia, friction, or wear. Because the valve elements are responsive at a high modulation rate (>10 kHz), the LCU 21 can effect a beam displacement very quickly. Potential scan line spacing errors may therefore be compensated instantaneously, even during a line scan exposure, before such errors accumulate. The image-degrading effects, if any, of beam displacement are minimized because the requisite amount of displacement is minimized.

The invention has been described in detail with particular reference to preferred embodiments thereof, but it will be understood that variations and modifications can be effected within the spirit and scope of the invention as described hereinabove and as defined in the appended claims.

What is claimed is:

1. A method for light beam scanning of a scan receiving member, comprising the steps of:
   generating a light beam;
   admitting a portion of the light beam and blocking the remainder of the light beam so as to form an admitted light beam;
   deflecting the admitted light beam so as to effect plural line scanning of the scan receiving member;
   providing spacing between sequential scan lines;
   determining potential scan line spacing error; and
   controlling the admitted light beam portion in accordance with the potential scan line spacing error so as to displace the admitted light beam to compensate for such error.

2. The method of claim 1, wherein the step of light beam admission further comprises the step of admitting a row-configured segment of the light beam.

3. The method of claim 1, wherein the step of light beam admission further comprises the step of admitting an area-configured segment of the light beam.

4. The method of claims 2 or 3, wherein the step of beam admission further includes the step of modulating the admitted beam portion to maintain a constant light intensity in the admitted beam as the beam is displaced.

5. The method of claim 1, wherein the step of light beam generation further comprises the steps of:
   emitting coherent light;
   expanding the emitted light; and masking a peripheral portion of the expanded light emission.

6. The method of claim 1, wherein the step of providing scan line spacing further comprises providing relative motion in the cross-scan direction between the light beam and the scan receiving member so as to effect the spacing.

7. The method of claim 6, wherein the step of determining potential scan line spacing error further comprises the steps of:
  determining the rate of the relative motion in the cross-scan direction;
  determining the variation of the rate from a predetermined value; and
  determining the potential scan line spacing error in accordance with the calculated rate variation.

8. The method of claim 6, wherein the step of providing relative motion further comprises the step of transporting the scan receiving member.

9. The method of claim 8, wherein the step of determining the potential scan line spacing error further comprises the steps of:
  determining the position of a portion of the scan receiving member selected for scanning;
  determining the position of a portion of the scan receiving member upon which the scanning will actually be made; and
  determining the potential scan line spacing error in accordance with the differential between the scan receiving member positions.

10. A method for light beam scanning exposure of a photosensitive medium, comprising the steps of:
  generating a laser beam;
  admitting a portion of the laser beam and blocking the remainder of the laser beam so as to form an admitted beam;
  deflecting the admitted beam so as to effect repeated line scans of the photosensitive medium;
  selectably modulating the laser beam to effect plural line scan exposures of the photosensitive medium;
  providing relative motion in the cross-scan direction between the photosensitive medium and the admitted beam to effect spacing between sequential scan line exposures, the spacing being subject to error;
  determining potential scan line spacing error;
  generating an error correction signal; and
  controlling the admitted light beam portion in accordance with the error correction signal so as to displace the admitted beam to compensate for such error.

11. The method of claim 10, wherein the step of beam admission further includes the step of modulating the admitted beam portion to maintain a constant light intensity in the admitted beam as the beam is displaced.

12. Apparatus for scanning a light beam on a scan receiving member, comprising:
  means for generating a light beam;
  means for admitting and blocking first and second portions, respectively, of the light beam so as to form an admitted beam;
  means for deflecting the admitted light beam so as to effect plural line scanning of the scan receiving member;
  means for providing spacing between sequential scan lines;
  means for determining potential scan line spacing error; and
  means for controlling the light beam admission in accordance with the determination of the potential scan line spacing error so as to displace the admitted light beam to compensate for such error.

13. The apparatus of claim 12, wherein the means for light beam admission further comprises:
  means for providing a row-enabling signal; and
  a light valve array having plural light valve elements in a row-addressable configuration, said elements being selectively light admitting in response to the row-enabling signal.

14. The apparatus of claim 12, wherein the means for light beam admission further comprises:
  means for providing an area-enabling signal; and
  a light valve array having plural light valve elements in an area-addressable configuration, said elements being selectively light admitting in response to the area-enabling signal.

15. The apparatus of claims 13 or 14, wherein the means for controlling light beam admission further comprises means for modulating beam admission so as to maintain a constant light intensity in the admitted beam as the beam is displaced.

16. The apparatus of claim 12, wherein the means for light beam generation further comprises:
  means for emitting coherent light;
  means for expanding the emitted light; and
  means for masking the expanded light emission.

17. The apparatus of claim 12, wherein the means for providing scan line spacing further comprises means for providing relative motion in the cross-scan direction between the light beam and the scan receiving member so as to effect the spacing.

18. The apparatus of claim 17, wherein the means for determining potential scan line spacing error further comprises:
  means for determining the rate of the relative motion in the cross-scan direction;
  means for determining the variation of the rate from a predetermined value; and
  means for determining the potential scan line spacing error in accordance with the calculated rate variation.

19. The apparatus of claim 17, wherein the means for providing relative motion further comprises means for transporting the scan receiving member.

20. The apparatus of claim 12, wherein the means for determining the potential scan line spacing error further comprises:
  means for determining the position of a portion of the scan receiving member selected for scanning;
  means for determining the position of a portion of the scan receiving member upon which the scanning will actually be made; and
  means for determining the potential scan line spacing error in accordance with the differential between the scan receiving member positions.

21. Apparatus for light beam scanning exposure of a photosensitive medium, comprising:
  means for generating a laser beam;
  means for admitting a portion of the laser beam and blocking the remainder of the laser beam so as to form an admitted beam;
  means for deflecting the admitted beam so as to effect repeated line scans of the photosensitive medium;
  means for selectably modulating the laser beam to effect plural line scan exposures of the photosensitive medium;
  means for providing relative motion in the cross-scan direction between the photosensitive medium and the admitted beam to effect spacing between sequential scan line exposures, the spacing being subject to error;
  means for determining the error in the spacing;
  means for generating an error correction signal; and means for controlling the admitted light beam portion in accordance with the error correction signal so as to displace the admitted beam to compensate for such error.

22. The apparatus of claim 21, wherein means for beam admission further includes means for modulating the admitted beam portion to maintain a constant light intensity in the admitted beam as the beam is displaced.

* * * * *